United States Patent
Offermans et al.

(10) Patent No.: US 11,817,632 B2
(45) Date of Patent: Nov. 14, 2023

(54) CIRCUIT FOR OPTOELECTRONIC DOWN-CONVERSION OF THZ SIGNALS

(71) Applicants: IMEC VZW, Leuven (BE); Stichting IMEC Nederland, Eindhoven (NL)

(72) Inventors: Peter Offermans, Zaltbommel (NL); Davide Guermandi, Heverlee (BE); Ashwyn Srinivasan, Heverlee (BE)

(73) Assignees: Imec vzw, Leuven (BE); Stichting IMEC Nederland, Eindhoven (NL)

( * ) Notice: Subject to any disclaimer, the term of this patent is extended or adjusted under 35 U.S.C. 154(b) by 337 days.

(21) Appl. No.: 17/466,908

(22) Filed: Sep. 3, 2021

(65) Prior Publication Data
US 2022/0077603 A1 Mar. 10, 2022

(30) Foreign Application Priority Data
Sep. 7, 2020 (EP) .................................. 20194884

(51) Int. Cl.
*H01Q 23/00* (2006.01)
*H01Q 9/28* (2006.01)

(52) U.S. Cl.
CPC ............ *H01Q 23/00* (2013.01); *H01Q 9/285* (2013.01)

(58) Field of Classification Search
None
See application file for complete search history.

(56) References Cited

U.S. PATENT DOCUMENTS

| | | | |
|---|---|---|---|
| 6,388,799 B1 | 5/2002 | Arnone et al. | |
| 7,291,839 B1 | 11/2007 | Demers et al. | |
| 7,781,736 B2 | 8/2010 | Logan, Jr. et al. | |
| 8,975,584 B2 | 3/2015 | Sartorius et al. | |
| 9,618,824 B2 | 4/2017 | Mohammed et al. | |
| 2010/0244656 A1* | 9/2010 | Ito ........................ | H01Q 23/00 343/843 |

FOREIGN PATENT DOCUMENTS

| | | |
|---|---|---|
| JP | 4147487 B2 | 9/2008 |
| WO | 9719527 A1 | 5/1997 |

OTHER PUBLICATIONS

Helkey et al. "A Down-Conversion Optical Link with RF Gain" Journal of Lightwave Technology, vol. 15 No. 6, Jun. 1997 (Year: 1997).*
Rouvalis et al. "Optically Pumped Mixing at 100 GHz with Travelling-Wave Uni-Travelling Carrier Photodiodes" Optical Society of America 2011 (Year: 2011).*
Extended European Search Report and Written Opinion, Application No. EP20194884.1, dated Mar. 10, 2021, 5 pages.

* cited by examiner

*Primary Examiner* — Edwin C Gunberg
(74) *Attorney, Agent, or Firm* — McDonnell Boehnen Hulbert & Berghoff LLP

(57) ABSTRACT

A circuit for optoelectronic down-conversion of a terahertz, THz, signal comprises a first photodiode and a second photodiode configured to be excited by an optical beat signal. The photodiodes are coupled in series through a common antenna. The terminals of the antenna are coupled to form an output terminal and the antenna is configured to receive the terahertz, THz, signal. The photodiodes thereby, via the optical beat signal, respectively, down-convert the THz signal and generate a current comprising an intermediate frequency, IF, component and a direct current, DC, component. The respective generated currents are summed at the output terminal, thereby obtaining the IF components and cancelling the DC components.

20 Claims, 1 Drawing Sheet

CIRCUIT FOR OPTOELECTRONIC DOWN-CONVERSION OF THZ SIGNALS

CROSS-REFERENCE TO RELATED APPLICATIONS

The present application is a non-provisional patent application claiming priority to European Patent Application No. 20194884.1, filed Sep. 7, 2020, the contents of which are hereby incorporated by reference.

FIELD OF THE DISCLOSURE

The present disclosure relates to terahertz, THz, detectors. More particularly, the present disclosure relates to a circuit for optoelectronic down-conversion of THz signals.

BACKGROUND

Terahertz, THz, waves, which cover the frequency range from 100 GHz to 10 THz, have been actively applied to applications that involve sensing, radar, spectroscopy, measurement, and communication.

THz signal detection may be performed by a photodetector, such as a photoconductor or a photodiode, which down-converts the THz signal into an intermediate frequency, IF, signal by employing the concept of optically pumped mixing. An example of optically pumped mixing based on a photodiode is disclosed in E. Rouvalis, et al. "*Millimeter-Wave Optoelectronic Mixers Based on Uni-Traveling Carrier Photodiodes*", IEEE Transactions on Microwave Theory and Techniques 2012. In the case of THz detection, optically pumped mixing involves down-converting a THz signal into an intermediate frequency via a local oscillator signal that is generated through photomixing. Photomixing involves generating an optical heterodyne signal, or optical beat signal, to modulate the conductivity of a photoconductor or a photodiode. The modulated conductivity results in a modulated photocurrent when a DC bias is applied to the photoconductor or photodiode, which can be coupled out as a THz wave using an antenna. Conversely, when an AC bias is applied to the photoconductor or photodiode by means of a THz wave received through a connected antenna, the optically pumped mixing process results in a photocurrent at an intermediate frequency.

THz detectors employing a photodiode as a photodetector generate a photocurrent resulting from the optical beat signal typically referred to as a background photocurrent. When the photodiode is excited with a THz signal, a down-conversion photocurrent is generated in addition to the background photocurrent. The background photocurrent, however, may be larger than the down-conversion photocurrent generated by the photodiode when induced with the THz signal. The larger background photocurrent may obscure the down-conversion photocurrent associated with the THz signal, thereby making it difficult to separate the down-conversion photocurrent from the background photocurrent.

SUMMARY

Some example embodiments described herein provide a low-cost and compact circuit for detecting terahertz signals which facilitates eliminating the effect of background photocurrent. Some example embodiments described herein provide a circuit configured to down-convert both modulated and unmodulated THz signals. Some example embodiments described herein provide a circuit that may be integrated into an integrated circuitry.

These and other aspects are achieved, according to a first example embodiment of the present disclosure, by a circuit for optoelectronic down-conversion of a terahertz, THz, signal, the circuit comprising:

a first photodiode and a second photodiode configured to be excited by an optical beat signal, the photodiodes being coupled in series through a common antenna, wherein terminals of the antenna are coupled to form an output terminal, and wherein the antenna is configured to receive the terahertz, THz, signal; the photodiodes thereby, by means of the optical beat signal, respectively down-converting the THz signal and generating a current comprising an intermediate frequency, IF, component and a direct current, DC, component, wherein the respective generated currents are summed at the output terminal, thereby obtaining the IF components and cancelling the DC components.

In other words, the photodiodes produce respective direct current, DC, components when excited or illuminated with an optical beat signal. This DC component is typically referred to as a background photocurrent. Further, the photodiodes respectively produce an additional current component with an intermediate frequency when a THz signal is received by the antenna. This component is typically referred to as the down-conversion photocurrent.

Coupling of the photodiodes in series through a common antenna, i.e., by coupling the photodiodes to opposite terminals of the antenna, ensures that the background photocurrents, which results from the optical beat signal, flow in the same direction. This configuration further ensures that the down-conversion photocurrents, which result from the THz signal received by the antenna, flow in the opposite direction along the path connecting the photodiodes. This facilitates obtaining the respective IF components, i.e., the down-conversion photocurrents, and cancelling the respective DC components. i.e., background photocurrents, at the output terminal. As a result, the circuit outputs a photocurrent comprising the IF current components resulting from the down-conversion of the THz signal.

Cancelling of the respective DC components obviates the need for complex post-processing of the resulting photocurrent. As a result, a low-cost and a compact read-out electronic circuitry may be used for further processing the photocurrent outputted by the optoelectronic down-conversion circuit.

Furthermore, as the optoelectronic down-conversion circuit does not require complex electronic integration, it may be easily integrated into integrated circuitry together with other electrical components.

According to an example embodiment, the photodiodes are configured to be connected at a respective terminal to bias circuitry. The bias circuitry is configured to bias a respective photodiode such that the DC components of the respective generated currents are substantially equal.

Biasing of the photodiodes ensures that the DC components of the respective generated currents are substantially equal and that the generated currents flow in the same direction. This ensures that the DC components of the generated currents cancel each other at the output terminal of the circuit. As a result, the DC component resulting from the optical beat signal is cancelled, thereby eliminating the need for complex read-out circuitry for further processing of the photocurrent outputted by the optoelectronic down-conversion circuit.

According to an example embodiment, the photodiodes are waveguide-coupled.

The photodiodes may comprise an active layer material of III-V or IV group. Examples of active layer materials include (In)GaN, (Si)Ge, (In)GaAs, and so on. By employing waveguide-coupled photodiodes, the optoelectronic down-conversion circuit is realized with a minimal footprint, which may be integrated into integrated circuitry. Furthermore, this facilitates the incorporation of multiple optoelectronic down-conversion circuits into the integrated circuitry, thereby allowing the creation of an array of such optoelectronic down-conversion circuits.

According to an example embodiment, the terminals of the antenna are coupled to the output terminal through respective transmission lines.

By coupling transmission lines to the respective antenna terminals, the virtual ground at the output terminal is converted to an open, allowing the photodiodes to be biased through the antenna, while isolating the antenna from the short at the output terminal.

According to a further example embodiment, one terminal of a respective photodiode is coupled to a respective terminal of the antenna and another terminal of the respective photodiode is coupled to a respective open transmission line.

By coupling open transmission lines to the respective photodiodes, the circuit is isolated at THz frequencies from the influence of parasitics of the biasing circuits and shorts at THz frequencies are provided between the terminals of the photodiodes coupled to the respective open transmission lines.

According to an example embodiment, the length of the transmission lines is a quarter of the wavelength of the THz signal.

By dimensioning the transmission lines as a quarter of the wavelength of the THz signal, opens at the terminals of the antenna and shorts at the terminals of the photodiodes opposite the terminals connected to the antenna are introduced at THz frequencies. This allows the photodiodes to be connected to the antenna while providing a short between them at DC frequency.

According to an example embodiment, the respective photodiodes are coupled to opposite terminals of the antenna via a matching network.

Coupling of the respective photodiodes through a matching network to the opposite terminals of the antenna ensures that maximum voltage is transferred from the antenna to the photodiodes.

According to example embodiments, the THz signal is a modulated or an unmodulated THz signal.

In the case of an unmodulated THz signal where both the frequency and phase of the optical beat frequency match that of the THz signal, the current component resulting from the down-conversion of the THz signal comprises a direct current, while in the case of a modulated THz signal, the resulting current component comprises an alternate current, AC, component centered around the intermediate frequency.

According to an example embodiment, the antenna is a differential antenna.

According to an example embodiment, the antenna is a narrowband differential antenna such as a dipole antenna.

According to a further embodiment, the antenna is a planar antenna.

According to a second example aspect, an integrated circuit is disclosed. The integrated circuit comprises the circuit for optoelectronic down-conversion of a modulated terahertz, THz, signal according to the first example aspect.

According to an example embodiment, the integrated circuit further comprises amplifying circuitry configured to amplify the current at the output of the circuit.

BRIEF DESCRIPTION OF THE FIGURES

The above, as well as additional features, will be better understood through the following illustrative and non-limiting detailed description of example embodiments, with reference to the appended drawings.

All the figures are schematic, not necessarily to scale, and generally only show parts that are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein. Rather, these embodiments are provided by way of example. Furthermore, like numbers refer to the same or similar elements or components throughout.

Figure 1B:
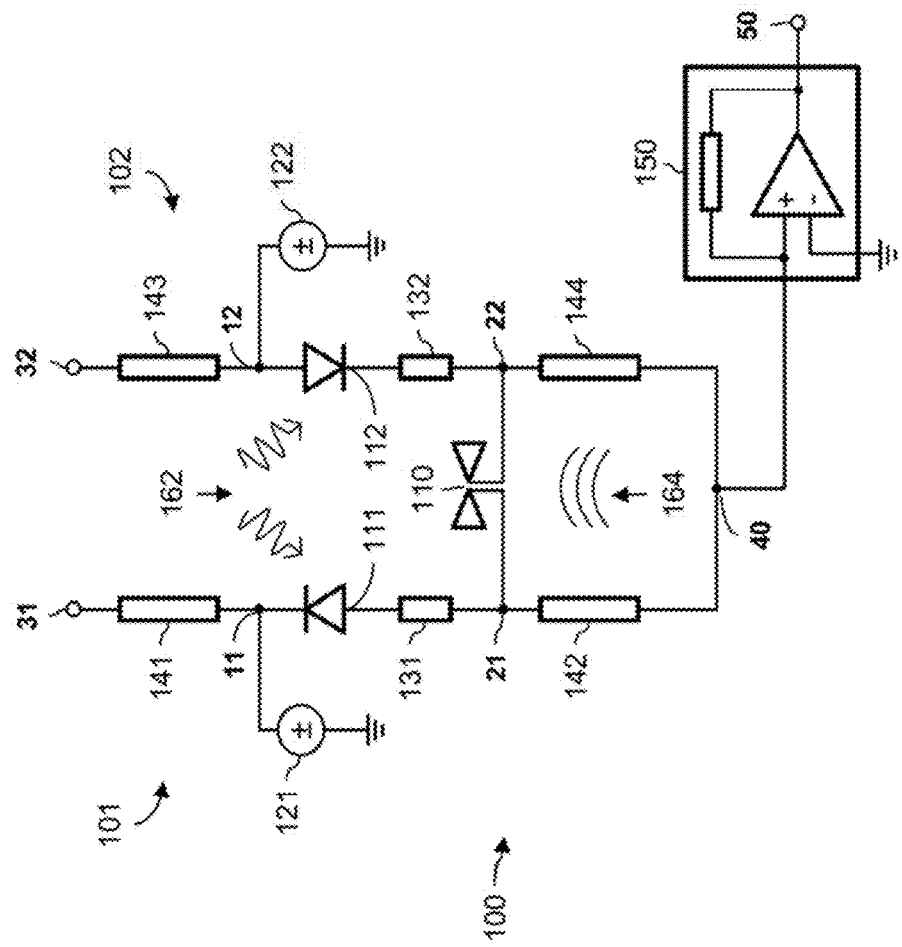
FIG. 1B shows an electrical schematic of the circuit for optoelectronic down-conversion of the THz signal, according to example embodiments.
Figure 1A:
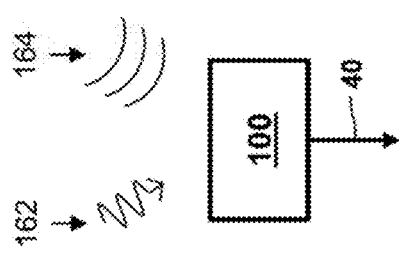
FIG. 1A shows a block diagram of a circuit that facilitates optoelectronic down-conversion of a THz signal, according to example embodiments.

FIG. 1A shows a block diagram of an optoelectronic down-conversion circuit 100 according to an embodiment of the present disclosure. The optoelectronic down-conversion circuit 100 down-converts THz signals by employing the principle of optically pumped mixing. This principle involves down-converting a THz signal 164 by means of an optical beat signal 162 acting as a local oscillator signal to output a down-converted THz signal. The optoelectronic down-conversion circuit 100 and its operation will be described in detail below with reference to FIG. 1B.

The circuit 100 comprises a first waveguide-coupled photodiode 111 and a second photodiode 112 coupled in series through a common differential antenna 110. That is, a second terminal, i.e., the anode, of the first photodiode 111 is coupled to a first terminal, i.e., the cathode, of the second photodiode 112 via the antenna 110. The respective photodiodes are configured to be excited or illuminated with the same optical beat signal 162. The photodiodes may be, for example, waveguide-coupled photodiodes. The antenna is configured to receive a THz signal 164, which may be modulated or unmodulated.

The terminals 21 and 22 of the antenna 110 are coupled together via respective transmission lines 142 and 144 to form the output terminal 40. Therefore, it suffices to use a narrowband antenna, such as a dipole or similar antenna. The terminals 21 and 22 are further coupled to the respective terminals of the photodiodes via matching networks 131 and 132. In other words, the anode of the first photodiode 111 is coupled to the cathode of the second photodiode 112 via a pair of transmission lines 142 and 144 with the antenna 110 connected in between the transmission lines. Further, the opposite terminals of the photodiodes 111 and 112, i.e., terminals 11 and 12, are coupled to respective open transmission lines 141 and 143. The transmission lines 141 to 144 are sized to have a length of a quarter of the wavelength of the THz signal. In other words, the photodiodes 111 and 112 are effectively placed in between a pair of quarter-wavelength transmission lines 141-142 and 143-144. The terminals 11 and 12 of the respective photodiodes are further configured to be connected to respective bias circuitry. i.e., bias circuitry 121 and 122. The bias circuitry may respectively apply a DC bias to reverse-bias the photodiodes.

Dimensioning the transmission lines 141-144 to have a length of a quarter of the wavelength of the THz signal facilitates the introduction of a π/2 phase shift between the circuit paths defined by transmission lines 141 and 143 and by transmission lines 142 and 144, respectively. For the transmission lines 141 and 143 with respective open terminals 31 and 32, this introduces a short at terminals 11 and 12 at THz frequencies, while for the transmission lines 142 and 144, the π/2 phase shift converts the virtual ground at the output terminal 40 to an open at terminals 21 and 22 at THz frequencies, thereby allowing the photodiodes to connect to the same antenna while providing a short between them at DC frequency. Furthermore, the transmission lines 141 and 143 reduce the influence of parasitics effects caused by the biasing circuitry.

When an optical beat signal 162 excites or illuminates the photodiodes, the photodiodes 111 and 112 generate charge carriers with a fixed frequency corresponding to the frequency of the optical beat signal. This causes the photodiodes to respectively produce a DC current, commonly referred to as a background photocurrent, which flows from the cathode to the anode terminals of the respective photodiodes. As the photodiodes are coupled in series, the background photocurrents will effectively flow from the cathode of the second photodiode 112 to the anode of the first photodiode 111, i.e., from terminal 12 towards terminal 11.

When a THz signal 164 is received by the antenna 110, the antenna will induce a voltage over the photodiodes, causing a change in the velocity of the generated charge carriers. The matching networks 131 and 132 ensure that the maximum voltage is transferred or induced by the antenna over the photodiodes. As the antenna is provided in between the photodiodes, i.e., the photodiodes are respectively connected to a different terminal of the antenna, the voltage induced over the photodiodes will be with opposite polarity. If the phase and frequency of the optical beat signal and the THz signal match, optically pumped mixing is observed at the photodiodes resulting in the generation of a maximum down-conversion photocurrent in addition to the background photocurrent. This is referred to as a coherent homodyne down-conversion process. As the voltage induced over the photodiodes has an opposite polarity, the resulting down-conversion photocurrents will flow in the opposite direction along the path connecting both photodiodes.

Depending on whether the THz signal is modulated or not, the induced voltage, and hence the charge carriers' velocity, will either be modulated or unmodulated. In the case of the modulated THz signal, e.g., amplitude or phase modulated, the down-conversion photocurrent generated by the respective photodiodes is also modulated. In other words, intermediate frequency, IF, down-conversion photocurrents are generated, which change magnitude and/or phase continuously with time in accordance with the modulation in the THz signal. In the case of the unmodulated THz signal where both the frequency and phase of the optical beat frequency match that of the THz signal, the IF down-conversion photocurrent generated by the respective photodiodes will comprise DC components.

The current components generated by the respective photodiodes, i.e., the DC component resulting from the optical beat signal and the down-conversion IF current component resulting from the received THz signal, are summed at the output terminal 40 of the circuit 100 to output a resulting photocurrent. As the output terminal 40 is formed in between the photodiodes 111 and 112, the DC components from the respective photodiodes flowing in the same direction along the path connecting the photodiodes effectively subtract one from another at the output terminal, while the IF components flowing in the opposite direction along the path connecting the photodiodes, effectively sum together.

Tuning the DC biasing of the respective photodiodes allows evening out the magnitudes of the DC components generated by them. Doing so assures that the DC components are cancelled out at the output terminal. This further allows adjusting the time-average photoconductance of the photodiodes to achieve optimal impedance matching between the respective photodiodes and the antenna. If the time-average conductivity is too low, then the resulting down-conversion current is decreased, while if too high, then voltage is lost due to the radiation resistance of the antenna itself. As a result, this further assures that the photodiodes generate IF components with an optimum magnitude.

The photocurrent outputted by the optoelectronic down-conversion circuit 100 may be read out by external read-out circuitry. For this purpose, external read-out circuitry may be coupled to the output terminal 40 of the circuit 100. The read-out circuitry may comprise amplifying circuitry, filtering circuitry, and a processor. In the FIGURE, only the amplifying circuitry ISO, i.e., a transimpedance amplifier, TIA, is shown. In this case, the transmission lines 142 and 144 coupled to respective terminals of the antenna further prevent shorting the antenna terminals at THz frequencies and isolate the optoelectronic down-conversion circuit from parasitics caused by the amplifier.

Furthermore, the optoelectronic down-conversion circuit facilitates determining the phase of the THz signal by, for example, employing two optoelectronic down-conversion circuits 100, respectively, illuminated with 90° phase-shifted optical beat signals. The phase of the THz signal may then be determined from the in-phase and quadrature down-conversion IF photocurrents outputted by the respective optoelectronic down-conversion circuits.

It will be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first," "second," third," "a," "b," "c," and the like, when used in the description or in the claims are introduced to distinguish between similar elements or steps and are not necessarily describing a sequential or chronological order. Similarly, the terms "top," "bottom," "over." "under," and the like are introduced for descriptive purposes and not necessarily to denote relative positions. It is to be understood that the terms so used are interchangeable under appropriate circumstances and examples of the embodiments are capable of operating in other sequences or in orientations different from the one(s) described or illustrated above.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A circuit for optoelectronic down-conversion of a terahertz, THz, signal, the circuit comprising:
   a first photodiode and a second photodiode configured to be excited by an optical beat signal; and
   a common antenna, wherein the photodiodes are coupled in series through the common antenna, wherein terminals of the antenna are configured to form an output terminal, and the antenna is configured to receive the terahertz, THz, signal,
   wherein the photodiodes thereby, via the optical beat signal, respectively down-convert the THz signal and generate a current comprising an intermediate frequency, IF, component and a direct current, DC, component, wherein the respective generated currents are summed at the output terminal, thereby obtaining the IF components and cancelling the DC components.

2. The circuit for optoelectronic down-conversion of a terahertz, THz, signal according to claim 1, wherein the photodiodes are configured to be connected at a respective terminal to a bias circuitry, wherein the bias circuitry is configured to bias a respective photodiode such that the DC components of the respective generated currents are substantially equal.

3. The circuit for optoelectronic down-conversion of a terahertz, THz, signal according to claim 2, wherein the photodiodes are waveguide-coupled.

4. The circuit for optoelectronic down-conversion of a terahertz, THz, signal according to claim 3, wherein the terminals of the antenna are coupled to the output terminal through respective transmission lines.

5. The circuit for optoelectronic down-conversion of a terahertz, THz, signal according to claim 4, wherein one terminal of a respective photodiode is coupled to a respective terminal of the antenna and another terminal of the respective photodiode is coupled to a respective open transmission line.

6. The circuit for optoelectronic down-conversion of a terahertz, THz, signal according to claim 5, wherein the respective photodiodes are coupled to opposite terminals of the antenna via a matching network.

7. The circuit for optoelectronic down-conversion of a terahertz, THz, signal according to claim 1, wherein the photodiodes are waveguide-coupled.

8. The circuit for optoelectronic down-conversion of a terahertz, THz, signal according to claim 1, wherein the terminals of the antenna are coupled to the output terminal through respective transmission lines.

9. The circuit for optoelectronic down-conversion of a terahertz, THz, signal according to claim 8, wherein the transmission lines have a length of a quarter of the wavelength of the THz signal.

10. The circuit for optoelectronic down-conversion of a terahertz, THz, signal according to claim 1, wherein one terminal of a respective photodiode is coupled to a respective terminal of the antenna and another terminal of the respective photodiode is coupled to a respective open transmission line.

11. The circuit for optoelectronic down-conversion of a terahertz, THz, signal according to claim 10, wherein the transmission lines have a length of a quarter of the wavelength of the THz signal.

12. The circuit for optoelectronic down-conversion of a terahertz, THz, signal according to claim 1, wherein the respective photodiodes are coupled to opposite terminals of the antenna via a matching network.

13. The circuit for optoelectronic down-conversion of a terahertz, THz, signal according to claim 1, wherein the THz signal is a modulated THz signal.

14. The circuit for optoelectronic down-conversion of a terahertz, THz, signal according to claim 13, wherein the antenna is a differential antenna.

15. The circuit for optoelectronic down-conversion of a terahertz, THz, signal according to claim 14, wherein the antenna is a planar antenna.

16. The circuit for optoelectronic down-conversion of a terahertz, THz, signal according to claim 1, wherein the THz signal is an unmodulated THz signal, and wherein the IF components of the respective currents generated by the photodiodes comprise a DC component.

17. The circuit for optoelectronic down-conversion of a terahertz, THz, signal according to claim 16, wherein the antenna is a narrowband differential antenna such as a dipole antenna.

18. The circuit for optoelectronic down-conversion of a terahertz, THz, signal according to claim 17, wherein the antenna is a planar antenna.

19. An integrated circuit comprising the circuit for optoelectronic down-conversion of a modulated terahertz, THz, signal according to claim 1.

20. The integrated circuit according to claim 19, further comprising amplifying circuitry configured to amplify the current at the output of the circuit.

* * * * *